May 26, 1936.　　　J. W. WHITE　　　2,041,890
BRAKE MECHANISM
Filed Jan. 21, 1935
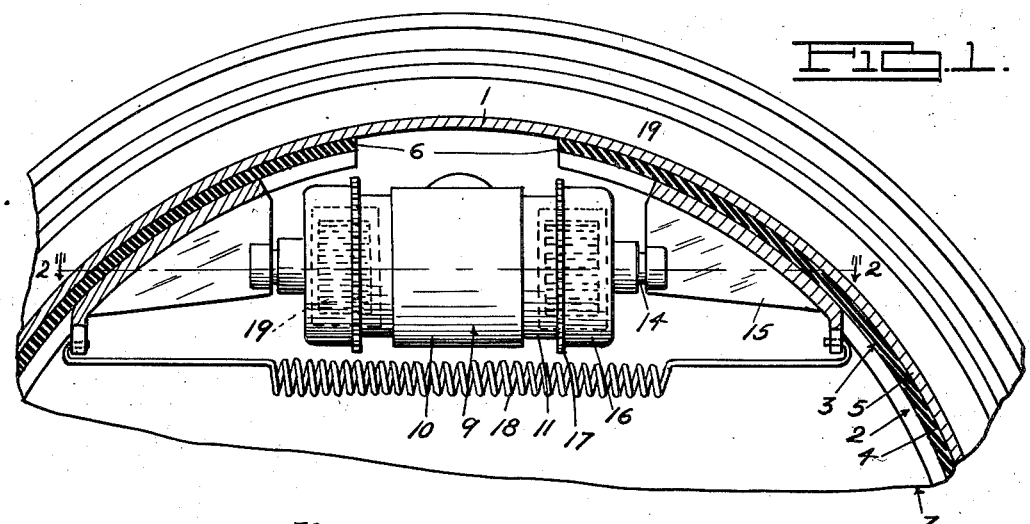
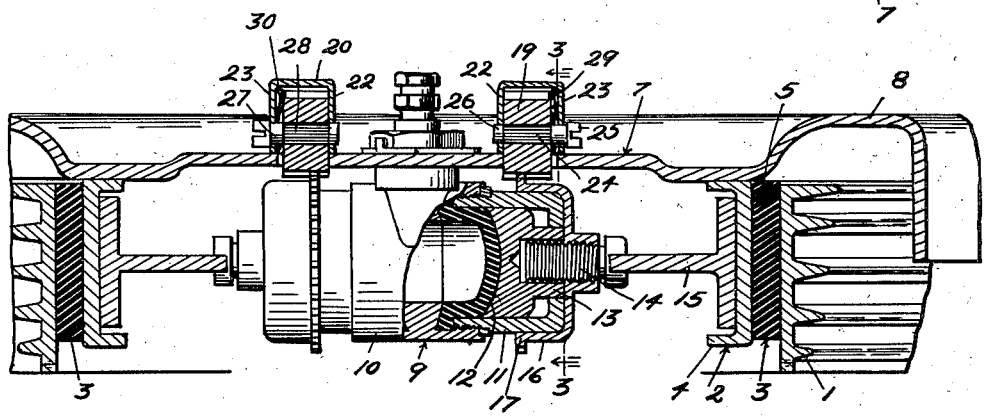
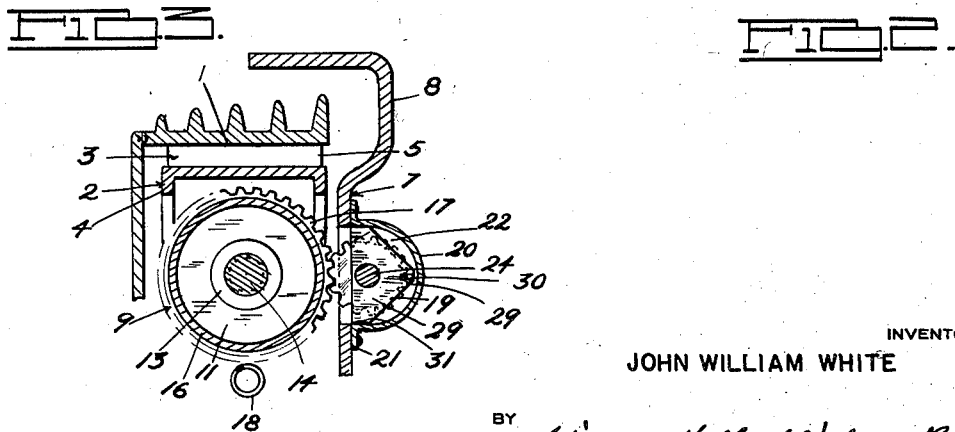
INVENTOR
JOHN WILLIAM WHITE
BY
ATTORNEYS Patented May 26, 1936

2,041,890

UNITED STATES PATENT OFFICE 2,041,890

BRAKE MECHANISM

John William White, Detroit, Mich., assignor, by mesne assignments, to General Motors Corporation, a corporation of Delaware Application January 21, 1935, Serial No. 2,785

3 Claims. (Cl. 188—79.5)

The invention relates to brake mechanism and has particular reference to vehicle brake mechanism of the internal type.

One of the objects of the invention is to provide an improved construction for readily manually adjusting the brake friction means engageable with the brake drum to provide limited clearance between the brake friction means and the brake drum. Other objects are to provide an improved mounting for the adjusting means and to provide a simple efficient form of device for holding the adjusted means in its various positions of adjustment.

These and other objects of the invention will become apparent from the following description, taken in connection with the accompanying drawing, in which Figure 1 is a sectional view of a brake mechanism showing an embodiment of my invention;

Figure 2 is a cross section on the line 2—2 of Figure 1;

Figure 3 is a cross section on the line 3—3 of Figure 2.

The brake mechanism, as shown, comprises the brake drum 1 which is adapted to be secured to a wheel of a motor vehicle and which has the brake flange 2. The brake mechanism also comprises the brake friction means 3 within the brake drum, this friction means comprising the shoe 4 and the lining 5. The shoe 4 in the present instance is in the nature of a transversely split flexible band having the end portions 6 spaced apart. 7 is the backing plate for closing the brake drum, this backing plate having the peripheral annular bead 8.

For applying the friction means against the drum flange, I have provided the actuator 9 which is positioned to spread the end portions 6. This actuator has the central support 10 which is mounted upon and fixedly secured to the backing plate 7 and the cup-shaped retainers 11 having their cylindrical walls threaded into the support and cooperating therewith to clamp and fixedly secure the flexible cup-shaped diaphragms 12 which with the support form a sack for receiving the braking fluid under pressure. Each diaphragm is engageable with a plunger 13 which slidably engages the cylindrical wall of a retainer and which has a reduced portion slidably engaging and adapted to extend through the end wall of a retainer. 14 is a screw having its inner end freely extending into the reduced portion of the associated plunger and having its outer end bifurcated to embrace the adjacent bracket 15 upon an end portion 6. 16 is a nut threaded upon each screw and adapted to abut the outer end of the reduced portion of the associated plunger. Each nut is cup-shaped and has a cylindrical wall adapted to encircle the adjacent retainer 11. The free edge of the cylindrical portion is formed with the annular flange 17 which is provided with peripheral teeth having their axes parallel to the axis of the actuator. With this construction it will be seen that when braking fluid under pressure enters the sacks the plungers will be forced away from each other and through the nuts and the screws the end portions of the brake bands will be separated and forced into engagement with the flange of the brake drum.

18 is a coil spring which is secured to the brackets 15 and which is located between the actuator and the axis of the brake drum and which urges the end portions of the band toward each other and holds the brackets against the screws and the nuts against the end walls of the retainers. Each nut is adapted to be rotatively adjusted by means of an associated spur gear 19 having its teeth meshing with the teeth upon the annular flange 17. Each spur gear is supported by and housed within the housing 20 which is preferably formed of sheet metal. This housing has the foot flanges 21 which are fixedly secured as by welding to the outer side of the backing plate 7 and each housing also has the end walls 22 and 23 at the opposite ends of the spur gear. 24 is a shaft having at one end the head 25 which is preferably slotted to receive a screw driver or the like. The opposite end of the shaft has the bearing portion 26 which is journaled in the end wall 22 and the portion of the shaft adjacent the head 25 has the bearing portion 27 which is journaled in the end wall 23. The shaft has intermediate this bearing portion the roughened or knurled portion 28 which is forced into and fixedly secured to the gear. The bearing portion 26 is of smaller diameter than the roughened or knurled portion 28, while the bearing portion 27 is of greater diameter. To hold each gear in its position of rotative adjustment, I have provided the resilient detent 29. This detent is preferably formed of spring steel and is located between the end wall 23 and the adjacent end of the spur gear. The detent has at its outer end the portion 30 which is adapted to engage the interdental spaces. The shaft 24 has its bearing portion 27 of sufficient length to extend through the detent and this detent has a generally triangular shape providing the end portions 31, which are adapted to substantially fit within the housing 20, so that the detent is held from rocking about the shaft. These end portions are square and located at the side of the axis of the shaft 24 opposite the portion 30.

What I claim as my invention is:

1. The combination of a brake drum, a backing plate, friction means within and engageable with said drum, an actuator for applying said friction means against said drum, said actuator comprising a reciprocable plunger, a screw and a rotatable nut threaded upon said screw and adapted to abut said plunger, said nut being cup-shaped and terminating at its edge in a peripherally toothed annular flange, a rotatably adjustable gear having its teeth meshing with the teeth of said nut, and a resilient detent at an end of said gear having a portion engageable in the interdental spaces.

2. The combination of a brake drum, a backing plate, friction means within and engageable with said drum, an actuator for applying said friction means against said drum, said actuator comprising a reciprocable member, an axially movable member and a rotatable member longitudinally adjustable upon said axially movable member, said rotatable member being adapted to abut said reciprocable member and having peripheral teeth, a spur gear having its teeth meshing with the teeth of said rotatable member, a housing for said spur gear secured to said backing plate, said housing having walls at the ends of said spur gear, and a shaft having bearing portions of different diameter journaled in said housing walls and having a roughened portion intermediate said bearing portions extending through and secured to said spur gear.

3. The combination of a brake drum, a backing plate, friction means within and engageable with the drum, an actuator for applying said friction means against said drum, said actuator comprising a reciprocable member, a two-part transmitting member between and operably related to said reciprocable member and friction means, one of said parts being adjustable relative to the other and adapted to engage said actuator in the release position of said friction means, said last-named part having peripheral teeth, a housing mounted on said backing plate, a gear member rotatably supported in said housing and engaging said peripheral teeth, a detent between the wall of said housing and said gear member, said detent having a part engaging the interdental spaces of the gear member, said housing and detent constructed and arranged to prevent rotation of the latter.

JOHN WILLIAM WHITE.